Patented June 15, 1937

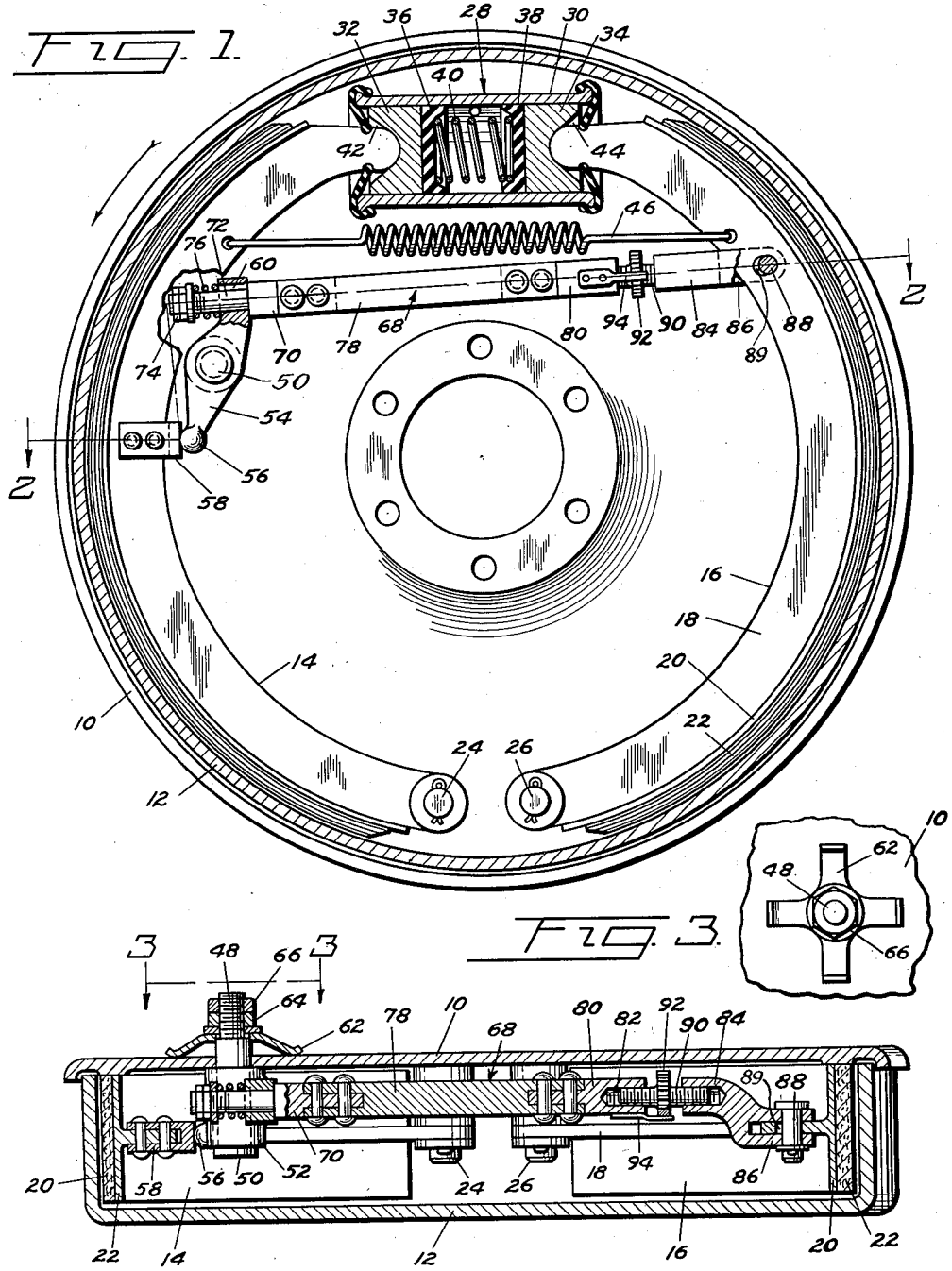

2,084,184

UNITED STATES PATENT OFFICE 2,084,184

BRAKE

Herbert C. Bowen, Detroit, Mich., assignor to Hydraulic Brake Company, Detroit, Mich., a corporation of California Application February 27, 1936, Serial No. 65,946

16 Claims. (Cl. 188—79.5)

This invention relates to brakes, and more particularly to brakes for motor vehicles.

Broadly the invention comprehends a brake structure including a fixed support, a rotatable drum associated therewith, friction elements or shoes mounted on the support for cooperation with the drum, means for moving the shoes into engagement with the drum, and means for automatically adjusting the friction elements or shoes to compensate for wear.

Heretofore various means have been used for automatically adjusting the friction elements or shoes of a brake to maintain a proper relation between the shoes and the drum. Generally such devices have not proved entirely satisfactory because of an inherent overadjustment of the shoes due to drum distortion. It is the aim of the present invention to overcome this difficulty.

It has been well established that in brake structures the relative position of the secondary or reverse shoe to the drum remains substantially constant, and it is proposed to make use of this factor in the accomplishment of a satisfactory automatic adjustment of the shoes.

An object of the invention is to provide a brake structure wherein an automatic adjustment means for the primary or forward brake shoe is controlled by movement of the secondary or reverse brake shoe.

Another object of the invention is to provide an automatic adjustment for the primary or forward brake shoe operated automatically by movement of the secondary or reverse brake shoe on both forward and reverse braking.

A further object of the invention is to provide a brake structure including a rotatable drum, a primary or forward brake shoe and a secondary or reverse brake shoe arranged for cooperation with the drum, means for moving the shoes into engagement with the drum, and means for automatically adjusting the shoes with relation to the drum to compensate for wear on the friction lining of the shoes including means variable in proportion to the expansion and contraction of the drum caused by changes in temperature.

Fig. 1 is a vertical sectional view of a brake structure taken just back of the head of the drum;

Fig. 2 is a cross-sectional view, substantially on line 2—2, Fig. 1; and

Fig. 3 is a detail view, substantially on line 3—3, Fig. 2.

Referring to the drawing for more specific details of the invention, 10 represents a fixed support or backing plate having associated therewith a rotatable drum 12. Arranged on the backing plate within the drum are corresponding friction elements or shoes 14 and 16. The friction element or shoe 14 is a primary or forward brake shoe, and the friction element or shoe 16 is a secondary or reverse brake shoe. Each of the shoes includes a web 18 supporting a rim 20 having suitably secured thereto frictional lining 22 adapted for cooperation with the drum 12.

The articulate ends of the shoes are pivoted on the backing plate 10 as by pivotal supports 24 and 26, and suitably secured on the backing plate between the separable ends of the shoes is a fluid pressure actuated motor indicated generally at 28, including a cylinder 30 having therein opposed pistons 32 and 34. The pistons have on their respective heads leak-proof cups 36 and 38, and a coil spring 40 interposed between the cups serves to retain them against displacement and to provide a suitable spacer for the pistons when in their retracted positions. The pistons have in their backs recesses 42 and 44 for the reception of the separable ends of the shoes, and a retractile spring 46 connecting the shoes serves to retain the shoes in close engagement with the pistons and to return the shoes to their off or retracted positions at the end of each braking operation.

Mounted for rotation in the backing plate adjacent the forward brake shoe is a stub shaft 48. One end of this shaft extends into the drum 12 and is provided with a head 50, and its other end extends outwardly from the backing plate. A sleeve 52 fitted on the shaft between the head 50 and the backing plate 10 has a cross arm 54, one end of which terminates in a spherical member 56 adapted to engage a stop 58 on the forward brake shoe 14 substantially centrally of the overall length of the shoe, and the other end of the arm 54 has an aperture 60, the purpose of which will hereinafter appear.

Sleeved on that end of the shaft 48 extending outwardly from the backing plate is a spring 62, preferably of the four-tine type, and threaded on the shaft is a nut 64 secured against displacement by a conventional locknut 66. By tightening the nut 64 the spring 62 may be placed under compression to clamp the sleeve 52 between the head 50 on the shaft 48 and the backing plate 10. This results in setting up frictional resistance to rotation of the sleeve and hence movement of the cross arm 54 formed integral with the sleeve.

A sectionalized rod indicated generally at 68 connects the cross arm 54 to the secondary or reverse brake shoe 16. As shown, the rod includes a section 70 having a reduced end portion 72 extending through the aperture 60 in the cross arm 54. This reduced end portion is threaded for the reception of a nut 74, and a spring 76 is sleeved on the reduced end portion between the cross arm and the nut. The spring 76 is of greater tensional strength than the resistance to rotation of the sleeve 52 introduced by the spring 62.

A metallic rod 78 having a relatively large coefficient of thermal expansion is suitably connected at one of its ends to the section 70, and the other end of the rod 78 is suitably connected to a short rod section 80 having an internally threaded sleeve 82. This sleeve is aligned with a corresponding internally threaded sleeve 84 having an off-set clevis 86 secured to the reverse shoe 16 by a pivot pin 88 in the web of the secondary or reverse shoe adjacent its free end. The pin 88 has a small clearance 89 in the web of the shoe providing for slight unhampered movement of the shoe. The aligned sleeves 82 and 84 receive a right and left-hand threaded member 90 provided with a star wheel 92 held against rotation by a spring clip 94 secured to the sleeve 80. By rotating the wheel 92 the length of the rod 68 may be increased or decreased to adjust the shoes with relation to the drum.

When the brake is in the off position or in the position of rest, the shoe 14 is retained against the spherical end 56 of the cross arm 54, and the shoe 16 is held against the pin 88 in the clevis 86 by the retractile spring 46. Under these conditions, upon an application of the brake while the vehicle is moving forward, the shoes 14 and 16 are moved by the fluid pressure actuated motor 28 into engagement with the drum, resulting in retardation of the drum.

Should the brake be applied for a sufficient length of time to cause the drum to expand, because of heat generated between the friction elements or shoes and the drum, the bar or rod 68, having a relatively large coefficient of thermal expansion, also expands due to heat absorbed from the brake. Hence, when the brake is released and the shoes returned to the off or retracted postion, under the influence of the retractile spring 46, they are retained in proper spaced relation to the drum for subsequent operations, and, since the bar 68 cools and contracts proportionately to the cooling and contracting of the drum, the spaced relation of the shoes with respect to the drum may be maintained substantially constant.

Should the friction lining of the shoes become worn due to repeated brake applications necessitating adjustment of the shoes, such adjustment may be automatically accomplished by movement of the reverse brake shoe 16 into engagement with the drum during a normal brake application. As this shoes moves into engagement with the drum, the clearance in the web of the shoe around the pivot pin 88 is taken up and a pull is exerted on the rod 68, and this force is transmitted through the spring 76 to the cross arm 54 to rock the arm on the shaft 48, resulting in moving the spherical end 56 of the arm to a newly adjusted position where it is retained by frictional engagement of the sleeve 52 with the backing plate and the head 50 on the stub shaft 48. The end 56 of the arm 54 serves to support the shoe 14 when this shoe is in off or retracted position, and the other end of the arm 54 is connected to one end of the rod 68, the other end of which carries the pin 88 providing a stop for supporting the shoe 16 when this shoe is in retracted position.

It is inherent in brake structures for the lining of the primary or forward brake shoe to wear faster than the lining of the secondary or reverse brake shoe. This differential in the wear of the linings of the respective brake shoes is provided for by the automatic adjustment mechanism which is so connected between the primary and secondary shoes that movement of the secondary shoe is multiplied when transferred to the primary shoe. It is to be observed that the automatic adjustment mechanism is connected to the secondary shoe adjacent to the free end of the shoe and engages the primary shoe substantially centrally of its overall length. Hence, when the secondary shoe is moved into engagement with the drum the movement is multiplied when transferred to the primary shoe.

During a brake application, while the vehicle is moving backward, the brake shoes 14 and 16 are moved into engagement with the drum 12 by the fluid pressure actuated motor 28 as in forward braking. However, under this condition the shoe 16 becomes the forward braking shoe and the shoe 14 becomes the reverse braking shoe, and since the brake shoe 16 when operated under these conditions performs the greater proportion of the work, its movement, due to drum distortion, is greater than when functioning as a reverse brake shoe.

This increased movement results in exerting a pull on the rod 68, and this force is transmitted through the springs 76 to the arm 54. This arm is held against any appreciable movement by the shoe 14. Due to drum distortion, movement of this shoe is practically nil, and hence any material movement of the arm 54 is inhibited. Slight movement of the shoe 14 may occur upon initial application of the brake; however, as the drum becomes distorted the shoe returns to engage the stop 58 with the spherical end of the arm 54. The shoe is free to move proportionately to the distortion of the drum without hindrance except that offered by compression of the spring 76. Under these conditions, when the brake is released and the shoes returned to their off or retracted positions by the retractile spring 46, the spring 76 functions to return the rod 78 to the position it maintained prior to the reverse braking operation, with the result that the shoes are again adjusted in proper spaced relation to the drum.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:—

1. A vehicle brake comprising a primary braking element and a secondary braking element, and an adjustable stop for the primary braking element connected to and actuated by the secondary braking element during forward movement of the vehicle.

2. A vehicle brake comprising a primary braking element, a secondary braking element, a stop for the primary braking element, and means for adjusting the stop operative by movement of the secondary brake element while the vehicle is travelling in a forward direction.

3. A vehicle brake comprising a primary braking element and a secondary braking element, a stop for the primary braking element, and means for adjusting the stop operative by movement of the secondary braking element while the vehicle is travelling in a forward direction, said means including means for compounding the movement of the secondary braking element when transferring such movement to the stop.

4. A vehicle brake comprising a primary braking element and a secondary braking element, an actuator for the braking elements, a retractor stop for the primary braking element, means operable while the vehicle is travelling in a forward direction for automatically adjusting the stop by movement of the secondary braking element and for compounding the movement of the secondary braking element when such movement is transferred to the stop.

5. A vehicle brake comprising a primary braking element and a secondary braking element, an actuator for the braking elements, a movable retractor stop for the primary braking element, means for transferring movement of the secondary braking element to the stop while the vehicle is travelling in a forward direction, and means for compounding the movement when transferred.

6. A brake comprising a primary braking element, a secondary braking element, an actuator for the braking elements, an adjustable stop for the primary braking element, said stop being adjustable relative to said primary braking element, an adjustable rod, a lost motion connection between the rod and the adjustable stop, and a lost motion connection between the rod and the secondary braking element.

7. A brake comprising a primary braking element, a secondary braking element, an actuator for the braking elements, an adjustable stop for the primary braking element adapted to support the primary braking element substantially centrally of its length, and means connecting the free end of the secondary braking element to the stop operative to compound the movement of the secondary braking element when such movement is transferred to the stop.

8. A brake comprising a primary braking element, a secondary braking element, an actuator for the braking elements, an adjustable stop for supporting the primary braking element substantially centrally of its length, an adjustable rod, a lost motion connection between one end of the rod and the stop, and a lost motion connection between the other end of the rod and the free end of the secondary braking element.

9. A brake comprising a fixed support, a drum associated therewith, braking elements on the support for cooperation with the drum, an actuator for the braking elements, a stop for one of the braking elements, said stop being adjustable relative to said braking element, and a rod connecting the adjustable stop to the other braking element.

10. A brake comprising a fixed support, a rotatable drum associated therewith, braking elements on the support for cooperation with the drum, an actuator for the braking elements, an adjustable stop for one of the braking elements including a rockable member, means resisting movement of the rockable member, and means connecting the rockable member to the other braking element.

11. A brake comprising a fixed support, a rotatable drum associated therewith, a primary braking element and a secondary braking element mounted on the support for cooperation with the drum, adjustable stops for the braking elements including a rockable member adjacent the primary braking element, and a member connecting the rockable member to the secondary braking element.

12. A brake comprising a fixed support, a rotatable drum associated therewith, a primary braking element and a secondary braking element arranged on the support for cooperation with the drum, a rockable arm on the support adapted to engage the primary braking element, means frictionally resisting movement of the arm, and a rod connecting the arm to the secondary braking element.

13. A brake comprising a fixed support, a rotatable drum associated therewith, a primary braking element and a secondary braking element arranged on the support for cooperation with the drum, an actuator for the braking elements, an arm pivoted on the support and adapted to engage the primary braking element, an adjustable rod, a lost motion connection between the rod and the arm, and a lost motion connection between the rod and the secondary braking element.

14. A brake comprising a fixed support, a rotatable drum associated therewith, a primary braking element and a secondary braking element arranged on the support for cooperation with the drum, an actuator for the braking elements, an arm pivoted on the support and adapted to engage the primary braking element, means resisting movement of the arm, an adjustable rod, a lost motion connection between one end of the rod and the arm, and a pin in the other end of the rod received by a slot in the web of the secondary braking element.

15. A brake comprising a fixed support, a rotatable drum associated therewith, a primary braking element and a secondary braking element arranged on the support for cooperation with the drum, an actuator for the braking elements, a cross arm pivotally mounted on the support, means frictionally resisting movement of the arm, one end of the arm providing a stop for the primary braking element, and a rod having high thermostatic characteristics connecting the other end of the cross arm to the secondary braking element.

16. A brake comprising a fixed support, a rotatable drum associated therewith, a primary braking element and a secondary braking element mounted on the support for cooperation with the drum, an actuator for the braking elements, an adjustable stop for the primary braking element mounted on the support substantially centrally of the element, a rod of high thermostatic characteristics, means for adjusting the overall length of the rod, a lost motion connection between one end of the rod and the adjustable stop, and a lost motion connection between the other end of the rod and the free end of the secondary braking element.

HERBERT C. BOWEN.